(12) United States Patent
Kumar et al.

(10) Patent No.: US 7,065,093 B1
(45) Date of Patent: Jun. 20, 2006

(54) METHOD AND APPARATUS FOR END-TO-END ATM CALLS BASED ON THE INTERWORKING OF ATM SWITCHED VIRTUAL CIRCUIT SIGNALING WITH Q.2630.1 AAL2 SIGNALING

(75) Inventors: Rajesh Kumar, Fremont, CA (US); Mohamed Saad-Eldin Mostafa, Emerald Hills, CA (US); John Gwilym Ellis, Pleasanton, CA (US)

(73) Assignee: Cisco Technology, Inc, San Jose, CA (US)

( * ) Notice: Subject to any disclaimer, the term of this patent is extended or adjusted under 35 U.S.C. 154(b) by 790 days.

(21) Appl. No.: 09/859,865

(22) Filed: May 17, 2001

(51) Int. Cl.
*H04L 12/28* (2006.01)
(52) U.S. Cl. .................... 370/401; 370/395.5
(58) Field of Classification Search ............ 370/351, 370/389, 395.1–395.72, 400, 401, 409
See application file for complete search history.

(56) References Cited

U.S. PATENT DOCUMENTS

| | | | |
|---|---|---|---|
| 5,870,397 A | | 2/1999 | Chauffour et al. |
| 6,147,971 A | * | 11/2000 | Rochberger et al. ........ 370/238 |
| 6,785,233 B1 | * | 8/2004 | Goyal et al. ................ 370/231 |
| 2001/0053145 A1 | * | 12/2001 | Willars et al. .............. 370/352 |
| 2002/0024954 A1 | * | 2/2002 | Cunetto et al. ........... 370/395.2 |
| 2004/0213206 A1 | * | 10/2004 | McCormack et al. ....... 370/352 |

OTHER PUBLICATIONS

"B-ISDN Signalling ATM Adaptation Layer (SAAL) Overview Description," Broadband ISDN, ITU-T Recommendation Q.2100, Jul. 1994, 7 pages.
"AAL Type 2 Signalling Protocol—Capability Set 1," Broadband ISDN—Common Aspects of B-ISDN Application Protocols for Access Signalling and Network Signalling and Interworking, ITU-T Recommendation Q.2630.1, Dec. 1999, 91 pages.
"AAL Type 2 Signalling Protocol—Capability Set 1—Annex B: SDL Definition of the AAL Type 2 Signalling Protocol CS-1," Broadband ISDN—Common Aspects of B-ISDN Application Protocols for Access Signalling and Network Signalling and Interworking, ITU-T Recommendation Q.2630.1—Annex B, Mar. 2001, 70 pages.

* cited by examiner

*Primary Examiner*—Huy D. Vu
*Assistant Examiner*—Jason Mattis
(74) *Attorney, Agent, or Firm*—The Law Office of Kirk D. Williams

(57) ABSTRACT

Methods and apparatus are disclosed for end-to-end ATM calls based on the interworking of ATM SVC signaling (such as private network-network interface signaling) with A.2630.1 AAL2 signaling. In one network, Q.2630.1 AAL2 signaling in the originating access segment triggers, on proper authentication, ATM SVC signaling (e.g., PNNI, IISP, AINI, etc.) in the core, which triggers Q.2630.1 AAL2 signaling in the terminating access segment. The triggering is done at the edge-core boundary where an AAL2 switch and/or multiplexer or an ATM switch with AAL2 multiplexing/switching capabilities is located. In the access network between the ATM-AAL2 edge switch and the edge gateway, multiplexed AAL2 virtual channel connections (VCCs) are typically used. Single-CID AAL2 SVCs are typically used in the core network, and between the ATM-AAL2 edge switch and PSTN trunk gateways. The binding of voice calls to ATM bearer channels is done at the edge gateway when triggered by a call agent.

11 Claims, 7 Drawing Sheets

METHOD AND APPARATUS FOR END-TO-END ATM CALLS BASED ON THE INTERWORKING OF ATM SWITCHED VIRTUAL CIRCUIT SIGNALING WITH Q.2630.1 AAL2 SIGNALING

FIELD OF THE INVENTION

This invention relates to asynchronous transfer mode (ATM) communications systems and networks; and more particularly, the invention relates to end-to-end ATM calls based on the interworking of ATM switched virtual circuit signaling with Q.2630.1 AAL2 signaling.

BACKGROUND OF THE INVENTION

The communications industry is rapidly changing to adjust to emerging technologies and ever increasing customer demand. This customer demand for new applications and increased performance of existing applications is driving communications network and system providers to employ networks and systems having greater speed and capacity (e.g., greater bandwidth). In trying to achieve these goals, a common approach taken by many communications providers is to use packet switching technology. Increasingly, communications service providers are building their communications infrastructure based on packet technology, and in particular, ATM technology, and providing voice over ATM communications services.

Providers and consumers of these communications services desire to have reliable voice over ATM services which efficiently and securely use the bandwidth and other resources of the access and core portions of the ATM networks. It is critical to a services provider that their network not be susceptible to theft of services or denial of service or other disruptions to its customers, which may transpire especially if customer premises equipment is allowed to setup switched virtual circuits (SVCs) using conventional techniques in the core ATM network.

Communications networks used to provide voice of ATM services typically have plenty of bandwidth available in the ATM core network, while bandwidth may be scarce in the access network. One approach in addressing the bandwidth resource issue in the access network is to use ATM Adaptive Layer 2 (AAL2) where multiple voice channels are multiplexed over an access link. AAL2 is especially useful for general purpose voice trunking, but its use in the core is not scaleable to large networks because it incurs the call processing and provisioning overhead of a two-tier network architecture (i.e., an AAL2 overlay network on top of an ATM network). Also, because AAL2 performs a function similar to a time division multiplexing hierarchical trunking architecture, it fails to fully exploit the flexible routing capabilities of Private Network-Network Interface (PNNI) ATM networks. PNNI is a trunking, routing, and signaling protocol which applies to a network of ATM switches, and in some cases, ATM-connected edge devices.

A network which used per-call SVCs in the access network (e.g., without AAL2 multiplexing) typically results in inefficient bandwidth usage, especially on leased lines with high recurring costs. This SVC approach also provides some additional security concerns.

Needed are new approaches and systems for seamlessly providing ATM calls over the access and core network portions of an ATM network and that marry the best aspects of AAL2 and ATM SVC connections.

SUMMARY OF THE INVENTION

Systems and methods are disclosed for establishing a network call spanning at least a first access network, a core network, and a second access network. One embodiment signals over the first access network a call setup request in a Q.2630.1 AAL2 message. A first segment of the network call is established over the first access network and the call setup request is authenticated. After call setup request is authenticated: a second segment of the network call is established through the core network a third segment of the network call is established through the second access network.

BRIEF DESCRIPTION OF THE DRAWINGS

The appended claims set forth the features of the invention with particularity. The invention, together with its advantages, may be best understood from the following detailed description taken in conjunction with the accompanying drawings of which:

DETAILED DESCRIPTION

Figure 1A:
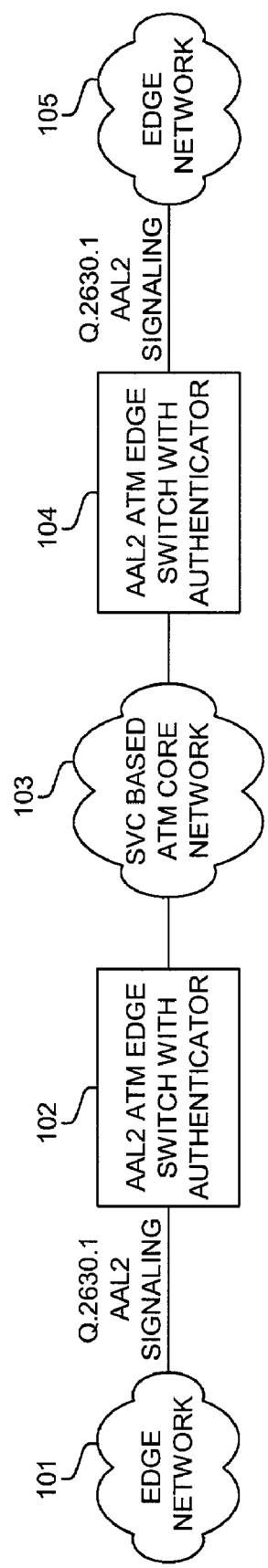
FIG. 1A is a block diagram of one embodiment of a network allowing end-to-end ATM calls based on the interworking of ATM SVC signaling with Q.2630.1 AAL2 signaling.

Methods and apparatus are disclosed for end-to-end ATM calls based on the interworking of ATM SVC signaling with Q.2630.1 AAL2 signaling. Examples of ATM SVC signaling are Private Network-Network Interface (PNNI) and ATM Inter Network Interface (AINI). Embodiments described herein include various elements and limitations, with no one element or limitation contemplated as being a critical element or limitation. Each of the claims individually recite an aspect of the invention in its entirety. Moreover, some embodiments described may include, but are not limited to, inter alia, systems, networks, integrated circuit chips, embedded processors, ASICs, methods, and computer-readable medium containing instructions. The embodiments described hereinafter embody various aspects and configurations within the scope and spirit of the invention.

At least three stages of signaling are typically used to establish a call across a network, with each signaling stage being triggered by a previous stage. These stages of signaling may include signaling in the originating access network, core or wide area network, and terminating access network, and authorization checks may be done before, after, or at each of these stages. For example, in one embodiment, Q.2630.1 AAL2 signaling in the originating access segment triggers, on proper authentication, ATM SVC signaling (e.g., PNNI, IISP, AINI, etc.) in the core, which triggers Q.2630.1 AAL2 signaling in the terminating access segment. The triggering is done at the edge-core boundary where an AAL2 switch and/or multiplexor or an ATM switch with AAL2 mtuliplexing/switching capabilities is located (sometimes referred to as an ATM-AAL2 edge switch). In the access network between the ATM-AAL2 edge switch and the edge gateway, multiplexed AAL2 virtual circuit connections (VCCs) are typically used. Depending on the method of their creation, these virtual circuit connections could be classified as switched virtual circuits (SVCs), switched permanent virtual circuits (SPVCs) or permanent virtual circuits (PVCs). Single-CID AAL2 SVCs are used in the core network, between the ATM-AAL2 edge switch and another ATM-AAL2 switch, or between the ATM-AAL2 edge switch and a PSTN trunk gateway. The binding of voice calls to ATM bearer channels is done at the edge gateway when triggered by a call agent. This binding is propagated through the network as bearer signaling, and is relayed from AAL2 signaling messages into ATM SVC signaling messages, and vice versa as part of the interworking function of the ATM-AAL2 switch. Additionally, addresses and other signaling parameters are interworked from Q.2630.1 AAL2 signaling into ATM SVC signaling, and vice versa.

In one embodiment, at a minimum, an AAL2 switched or permanent virtual circuit is established between an edge gateway and an AAL2 multiplexor/switch generally located at an ATM edge switch location such as a central office. Note that this central office need not always be the end office. For example, it could be a tandem office or a point-of-presence that is not co-located with the end office. If multiple homing is used for availability, multiple AAL2 switched or permanent virtual circuits can be established to AAL2 multiplexors/switches located in different central offices (or other ATM edge switch locations). These AAL2 switched or permanent virtual circuits support sub-cell multiplexing. The rationale for sub-cell multiplexing is to optimize bandwidth usage in the access, especially for coding schemes such as 8 Kbps G.729a.

In one embodiment, an appropriate traffic class (e.g., vbr-rt) is assigned to these AAL2 VCs which can be sized to take advantage of the statistical gains that accrue from silence suppression and AAL2 multiplexing. CIDs within these AAL2 access VCs are dynamically assigned, by the edge gateway or the AAL2 multiplexor/switch, to calls.

In addition to the AAL2 S/PVC for bearer traffic, in one embodiment, an AAL5 S/PVC is established between the edge gateway and each AAL2 multiplexor/switch to which it is connected. This switched or permanent virtual circuit supports Q.2630.1 (Q.AAL2) signaling over a Signaling ATM Adaptation Layer (SAAL). Q.2630.1 is used to bind calls to CIDs in the access and to trigger Q.2931-based SVC signaling (PNNI, AINI, IISP etc.) in the ATM core. In another embodiment, an AAL2 CID is used to transport Q.2630.1 (Q.AAL2) signaling over a Signaling ATM Adaptation Layer (SAAL), which resides on other lower layers defined in the ITU I.366.1 standard.

Typically, one or more of the following voice encoding schemes are used with sub-cell multiplexing in the access: G.711 with 5 ms packetization, G.726-32 with 5 ms packetization, G.726-32 with 10 ms packetization and G.729a with 10 ms packetization. Other voice encoding schemes may also be used in various embodiments. Many different encoding algorithms and packetization periods may be used, which are typically dictated by the VoAAL2 profile, which is typically assigned on a call-by-call basis. The use of echo cancellation and silence suppression is also typically determined on a call-by-call basis. In addition to voice service, various embodiments additionally or instead of which, support n×64 clear channels within the VoAAL2 access virtual circuits. Depending on the network context, n typically lies within the range of one to twenty-four or thirty-one. These clear channels can be signaled via an ISDN D-channel or provisioned.

In one embodiment, the edge gateway may be considered to work as a slave in conjunction with a call agent which has the call processing intelligence. In this embodiment, the call agent interprets backhauled signaling form the edge gateway and controls the endpoints within edge gateways. Embodiments typically use standard protocols or interim protocols that will eventually be replaced by standard protocols.

In one embodiment, one or more ATM switches equipped with a PNNI capability and capable of responding to UNI or UNI-like signaling, and one or more trunk gateways that connect the ATM switch to the PSTN are co-located at the central office or an equivalent site. Additionally, located at the central office (or other ATM edge switch location) are AAL2 multiplexors/switches equipped to run the Q.2630.1 signaling protocol. The call agent function, described hereinafter, may or may not be co-located at the central office (or other ATM edge switch location) with the functions listed above.

When AAL2 sub-cell multiplexing is used in the access, the edge AAL2 switch/multiplexor terminates AAL2 bearer VCs and AAL2 signaling VCs from the access. Towards the core, these multiplexors typically provide at least two capabilities described hereinafter.

First, these AAL2 switch/multiplexors trigger SVC establishment in the ATM core via a UNI or UNI-like signaling interface. Because there is no shortage of bandwidth in the ATM core, single-CID AAL2 VCs are established from the AAL2 multiplexor/switch into the core via ATM edge switches. The AAL2 switch/switch binds these SVCs into access CIDs on a call-by-call basis. The assignment of access CIDs to calls is done by the AAL2 switch/switch or by the edge gateway. When there is no shortage of bandwidth in the ATM core, these single-CID AAL2 SVCs are used for all calls. The single-CID SVCs from the AAL2 switch/switch are routed to an ATM edge switch equipped with a PNNI capability. The PNNI capabilities of ATM edge switches may be used to establish VP tunnels for voice between these switches. This is done prior to the set-up of calls. This simplifies the set-up of SVCs for voice calls. If VP tunnels are used in the core, SVCs in the core can be set-up without the need for routing in the core. For the sake of availability, dual core networks may be supported. The VPs between a pair of edge switches are redundantly routed over these cores.

Second, if there is a need to optimize the use of core bandwidth through the use of AAL2 sub-cell multiplexing, multi-CID AAL2 VCs are established from the AAL2 multiplexer/switch into the core via ATM edge switches to other AAL2 switch/multiplexers co-located with other edge switches. The AAL2 switch/switch binds CIDs on these VCs into access CIDs on a call-by-call basis. In this case, single-CID SVCs in the core serve as a traffic overflow mechanism. Generally, this is done for only those AAL2 switch/multiplexor pairs that have reasonably high call volumes between them. Two VCs are provided on dual redundant core networks between such a pair of AAL2 switches/switches. In addition to the AAL2 S/PVC for bearer traffic, an AAL5 S/PVC can be established between such preconnected AAL2 switch/multiplexors. This S/PVC supports Q.2630.1 (Q.AAL2) signaling over a SAAL layer. In this case, Q.2630.1 is used to bind calls to CIDs in the core as well as in the access. In lieu of this AAL5 S/PVC, an AAL2 CID may be used to transport Q.2630.1 (Q.AAL2) signaling over a Signaling ATM Adaptation Layer (SAAL), which resides on other lower layers defined in the ITU I.366.1 standard.

The trunk gateways in the central office provide connectivity to the legacy PSTN. Like the AAL2 switch/multiplexors, these trunk gateways trigger SVC establishment in the ATM core via a UNI or UNI-like signaling interface. Because there is no shortage of bandwidth in the ATM core, single-CID AAL2 VCs are established from the trunk gateway into the core via ATM edge switches. Under call agent control, the trunk gateway binds these SVCs into PSTN trunks on a call-by-call basis.

Like the edge gateway, the trunk gateway works as a dumb slave in conjunction with a call agent which has the call processing intelligence. The call agent interprets the SS7 signaling pertaining to the PSTN trunks to its slave trunk gateways. These are communicated via STP pairs in the legacy SS7 network. The call agent controls endpoints within trunk gateways via standard protocols such as the Media Gateway Control Protocol (MGCP) or the ITU H.248 protocol. Depending on the application, the trunk gateway interfaces to either a Class 4 switch or a Class 5 switch in the PSTN.

Although channel associated signaling (CAS) signaling is possible for the PSTN trunks to trunk gateways, it is antiquated and not emphasized in this context.

The call agent, in conjunction with the edge gateways, trunk gateways and the intermediate ATM network, constitutes a virtual switch. This virtual switch could be a Class 5 local switch replacement or a Class 4 tandem switch replacement. This call agent operates on the endpoints of a voice over packet connection. These are located in the edge gateways and trunk gateways. The call agent typically does not control the intermediate points of a connection. Rather, these are controlled by the bearer layer connection handling function. Entities comprising the bearer layer connection handling function use various signaling protocols such as Q.2630.1 and Q.2931 variants for communication.

Call agents interpret backhauled signaling from edge gateways and SS7 sigaling to set-up end-to-end voice over packet connections. Call agents communicate with each other and SS7-equipped PSTN switches via an SS7 signaling network. Q.BICC (Q.1901) extensions to standard ISUP can be used to communicate VoATM parameters between call agents.

FIG. 1A illustrates a block diagram of one embodiment of a network allowing end-to-end ATM calls based on the interworking of ATM SVC signaling with Q.2630.1 AAL2 signaling. Shown in FIG. 1A are a few components of a network, including edge network 101, AAL2 ATM edge switch with an authenticator 102, SVC based ATM core network 103, AAL2 ATM edge switch with an authenticator 104, and edge network 105. Although elements 101–105 are shown as a single block, of course, any of these elements 101–105 could be a system comprised of several subsystems. In the configuration shown, edge networks 101 and 105 use Q.2630.1 AAL2 signaling in establishing a call across the shown network, and AAL2 ATM edge switch with an authenticator 102 performs both signaling and security functions.

Figure 1B:
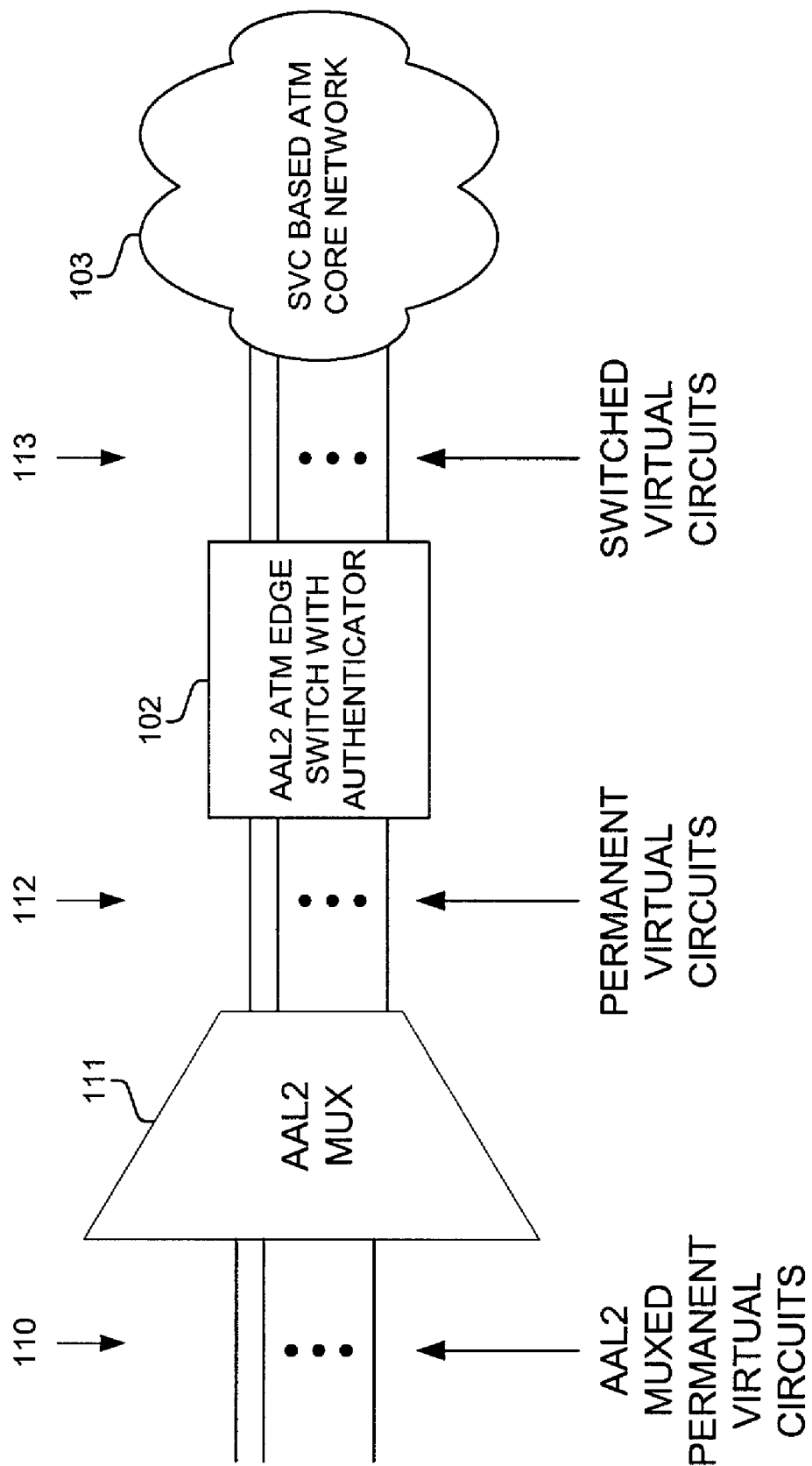
FIG. 1B is a block diagram of a portion of one network using Q.2630.1 AAL2 signaling.

FIG. 1B illustrates some communications mechanisms used in one embodiment of the network illustrated in FIG. 1A, wherein edge network 101 (FIG. 1A) includes an AAL2 multiplexor 111. AAL2 multiplexed permanent virtual circuits 110 are used over access links as shown, while permanent virtual circuits 112 are used in communicating between AAL2 multiplexor 111 and AAL2 ATM edge switch with authenticator 102, which uses switched virtual circuits 113 in communicating with SVC based ATM core network 103. In general, Q.2630.1 signaling allows dynamic assignment of channel identifiers (CIDs) and AAL2 sub-cell switching allows efficient use of bandwidth in the access portions of a network. Typically, AAL2 SVCs are employed in the core network using normal PNNI-based signaling. In one embodiment, this PNNI-based signaling is triggered by an edge switch in response to Q.2630.1 signaling from network equipment at the customer premises. In one embodiment, sub-cell multiplexing is used in the access segment and single-CID AAL2 SVCs in the core. In another embodiment, end-to-end single CID AAL2 SVCs are used.

Figure 2:
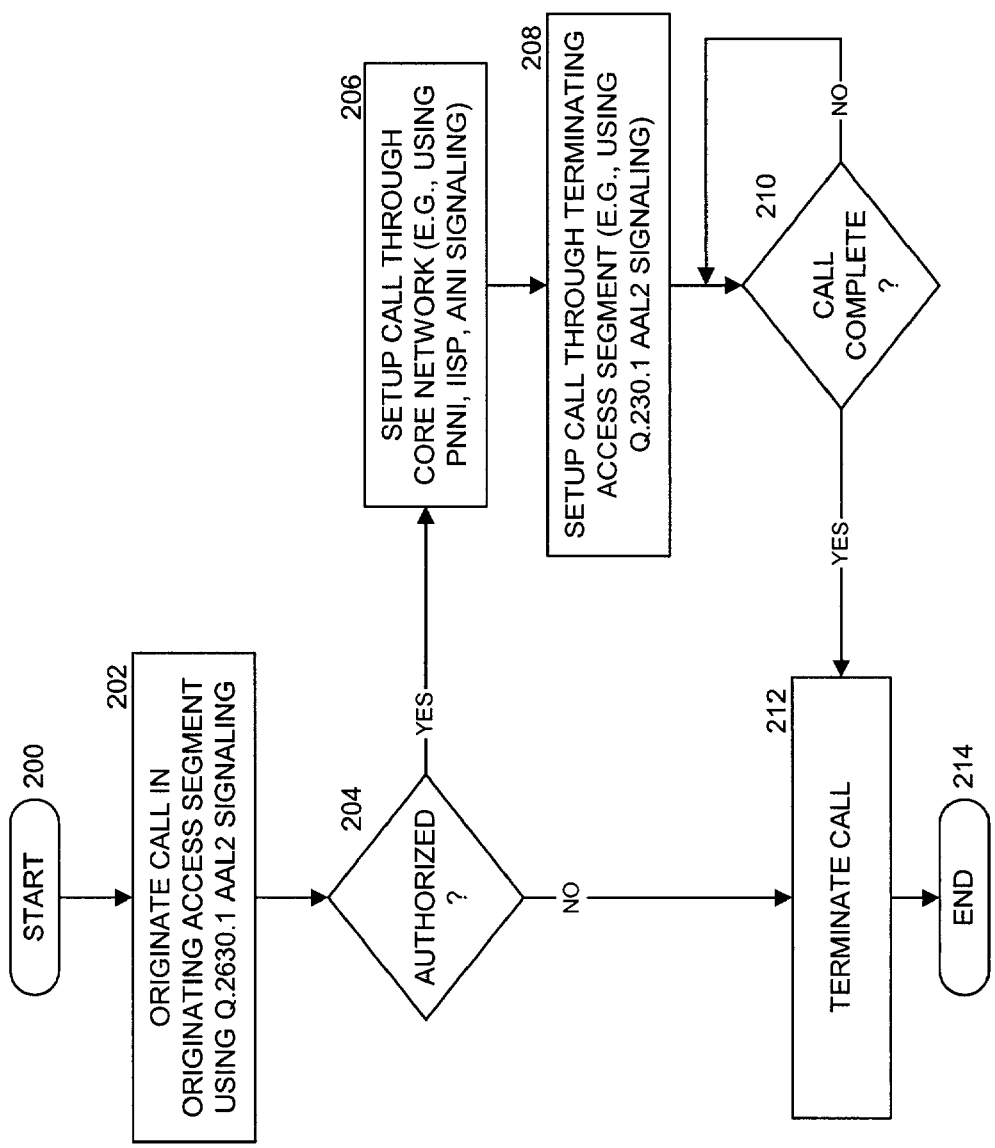
FIG. 2 is a flow diagram of one embodiment of a process for placing an ATM call using Q.2630.1 AAL2 signaling in the access network and ATM SVC signaling in the core network.

FIG. 2 illustrates a process performed by one network, such as that illustrated in FIG. 1A, in establishing a call using Q.2630.1 AAL2 signaling. Processing begins at process block 200, and proceeds to process block 202, wherein a call is originated in originating access segment using Q.2630.1 AAL2 signaling. If the call is not authorized as determined in process block 204 (e.g., checked by AAL2 ATM edge switch with an authenticator 102 of FIG. 1A), then the call processing is terminated in process block 212. Otherwise, processing proceeds to establish the call through the core network (e.g., SVC based ATM core network 103 of FIG. 1A) using one or more of multiple signaling protocols (e.g., PNNI, IISP, AINI) in process block 206 and through the terminating access segment in process block 208 (e.g., using Q.2630.1 AAL2 or other signaling). When the call is complete as determined in process block 210, the call is terminated in process block 212. Processing of this exemplary embodiment is concluded as indicated by process block 214.

Figure 3A:
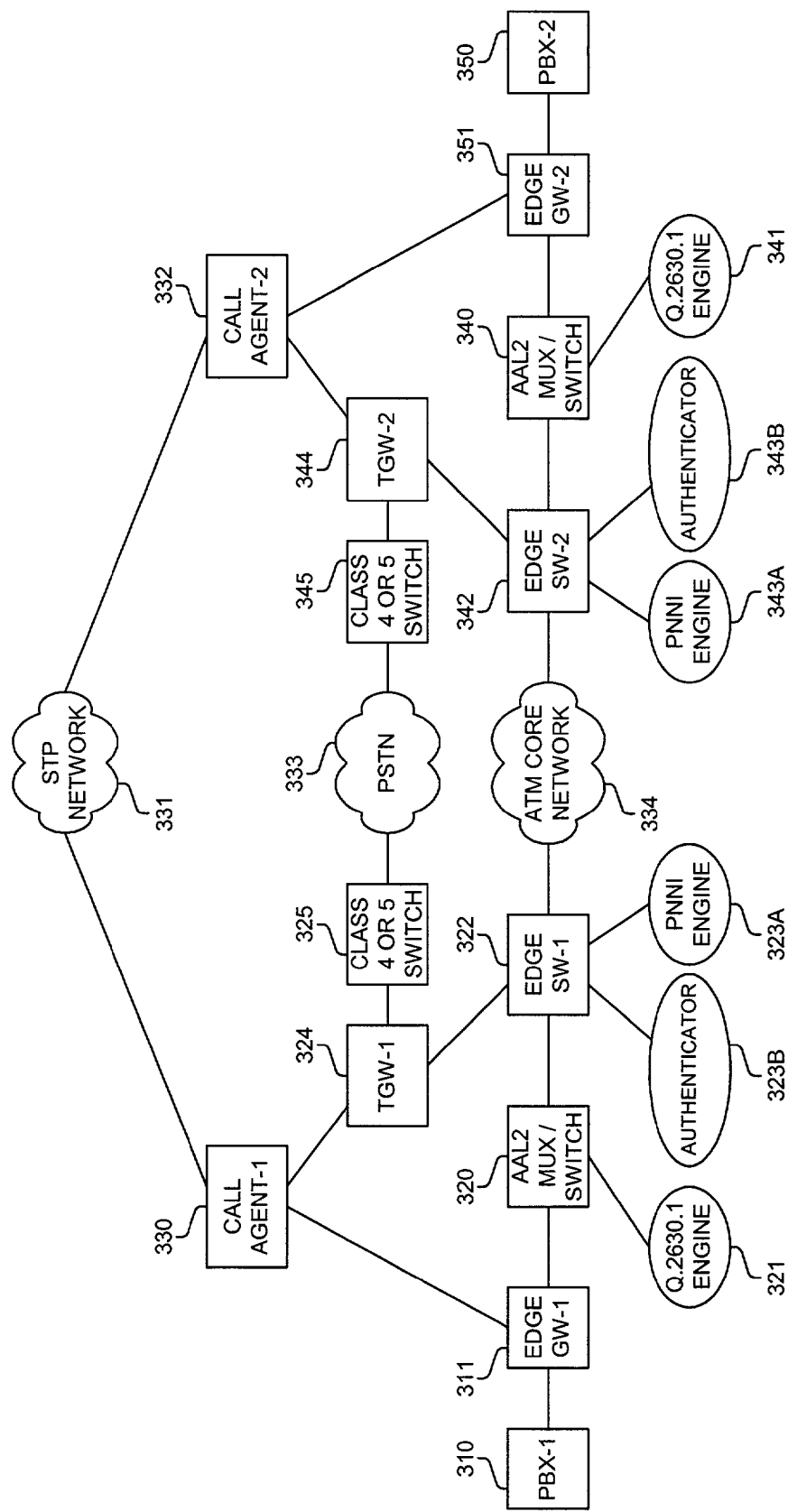
FIG. 3A is a block diagram of one network using a mix of Q.2630.1 AAL2 signaling and ATM SVC signaling according to one embodiment of the invention.

FIG. 3A illustrates an exemplary network using Q.2630.1 AAL2 signaling according to one embodiment of the invention for establishing a call from an originating access network device (e.g., PBX-1 310 or PBX-2 350) to a terminating access network device (e.g., PBX-1 310 or PBX-2 350) or to another device not shown (such as one connected via PSTN 333 or ATM core network 334).

PBX-1 310 communicates with edge gateway-1 (EGW-1) 311 using Q.2630.1 AAL2 sigaling. Edge gateways are typically placed at or near a point of presence of a communication carrier, and an edge gateway, for example, may include DSL or cable modems, wireless or terrestrial private line interface equipment, SONET access devices, etc., which typically interface with customer premises equipment. Generally, these edge gateways are owned by the service provider and are co-located with customer premises equipment. Call agent-1 330, signal transfer point (STP) network 331, and call agent-2 332 are part of a signaling network allowing signaling and coordination across networks.

Typically located in an edge switch location (e.g., a central office) are an AAL2 multiplexor/switch 320 with Q.2630.1 signaling engine 321, edge switch-1 322 (with PNNI signaling engine 323A and authenticator 323B) which provides switching functionality as well as an interface to ATM core network 334, trunk gateway-1 324, and a class 4 or 5 switch 325 which provides switching functionality as well as an interface to PSTN 333.

The operation of the PBX-2 350, edge gateway-2 351, AAL2 multiplexor/switch 340 with Q.2630.1 signaling engine 341, edge switch-2 342 with PNNI signaling engine 343A and authenticator 343B, trunk gateway-2 344 and class 4 or 5 switch are similar to their symmetric counterpart previously described herein, and thus, will not be repeated for reading simplicity.

Figure 3B:
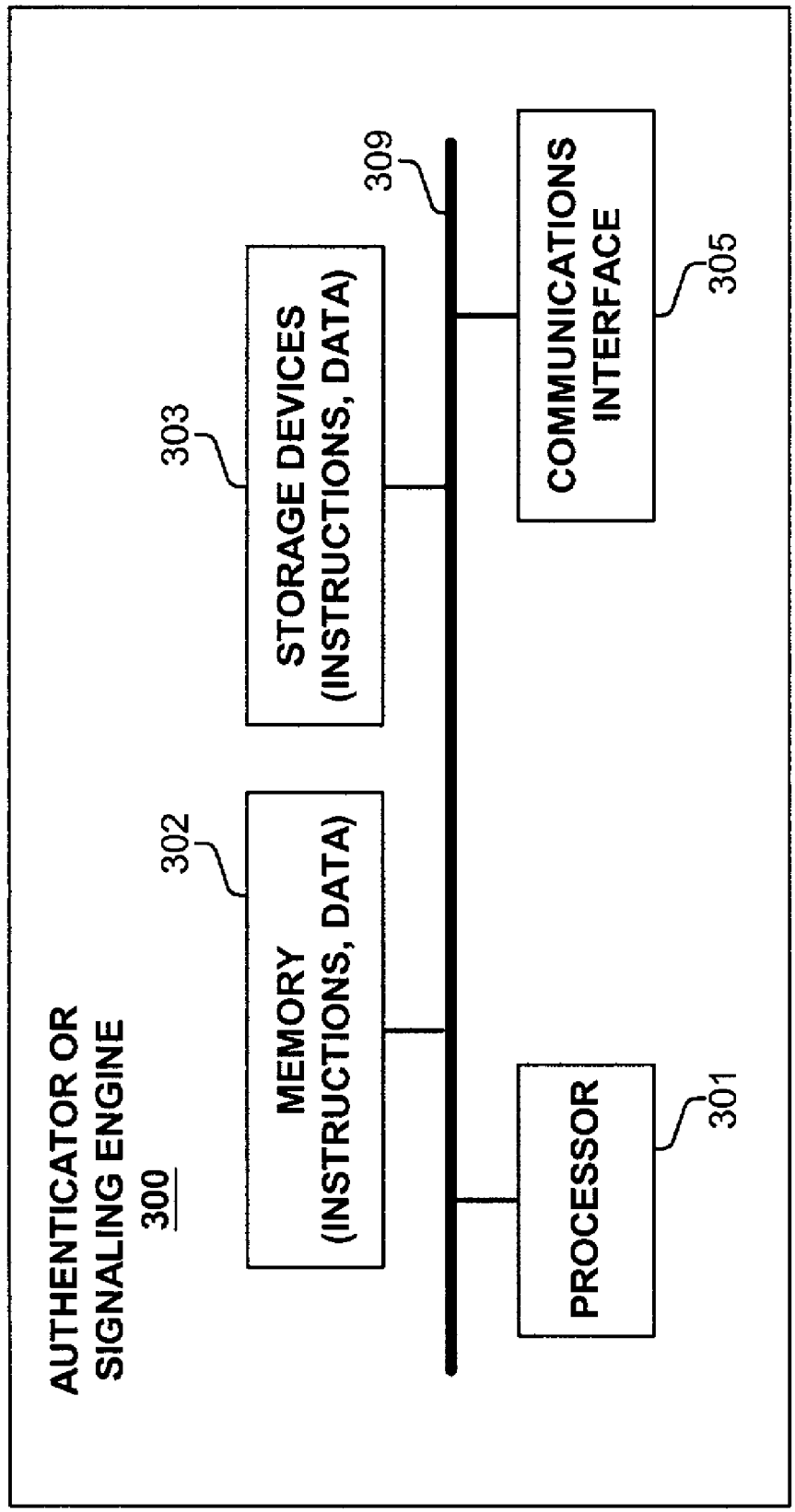
FIG. 3B is a block diagram of a signaling unit performing Q.2630.1 AAL2 signaling interworking with ATM SVC signaling according to one embodiment of the invention.

FIG. 3B illustrates one embodiment of a system which may be used as authenticator or signaling engine 300 (such as that of Q.2630.1 engines 321 and 341, PNNI engines 323A and 343A, and authenticators 323B and 343B shown in FIG. 3A), depending on the programming of the associated computer-readable medium. As shown, authenticator or signaling engine 300 comprises a processor 301, memory 302, storage devices 303, and a communications interface 305, which are electrically coupled via one or more communications mechanisms 309 (shown as a bus for illustrative purposes). The operation of authenticator or signaling engine 300 is typically controlled by processor 301 using memory 302 and storage devices 303, and communications interface 305. Memory 302 is one type of computer-readable medium, and typically comprises random access memory (RAM), read only memory (ROM), integrated circuits, and/or other memory components. Memory 302 typically stores computer-executable instructions to be executed by processor 301 and/or data which is manipulated by processor 301 for implementing functionality in accordance with the invention. Storage devices 303 are another type of computer-readable medium, and typically comprise disk drives, diskettes, networked services, tape drives, and other storage devices. Storage devices 303 typically store computer-executable instructions to be executed by processor 301 and/or data which is manipulated by processor 301 for implementing functionality in accordance with the invention.

As used herein and contemplated by the invention, computer-readable medium is not limited to memory and storage devices; rather computer-readable medium is an extensible term including memory, storage device, and/or other storage mechanism.

Figure 4A:
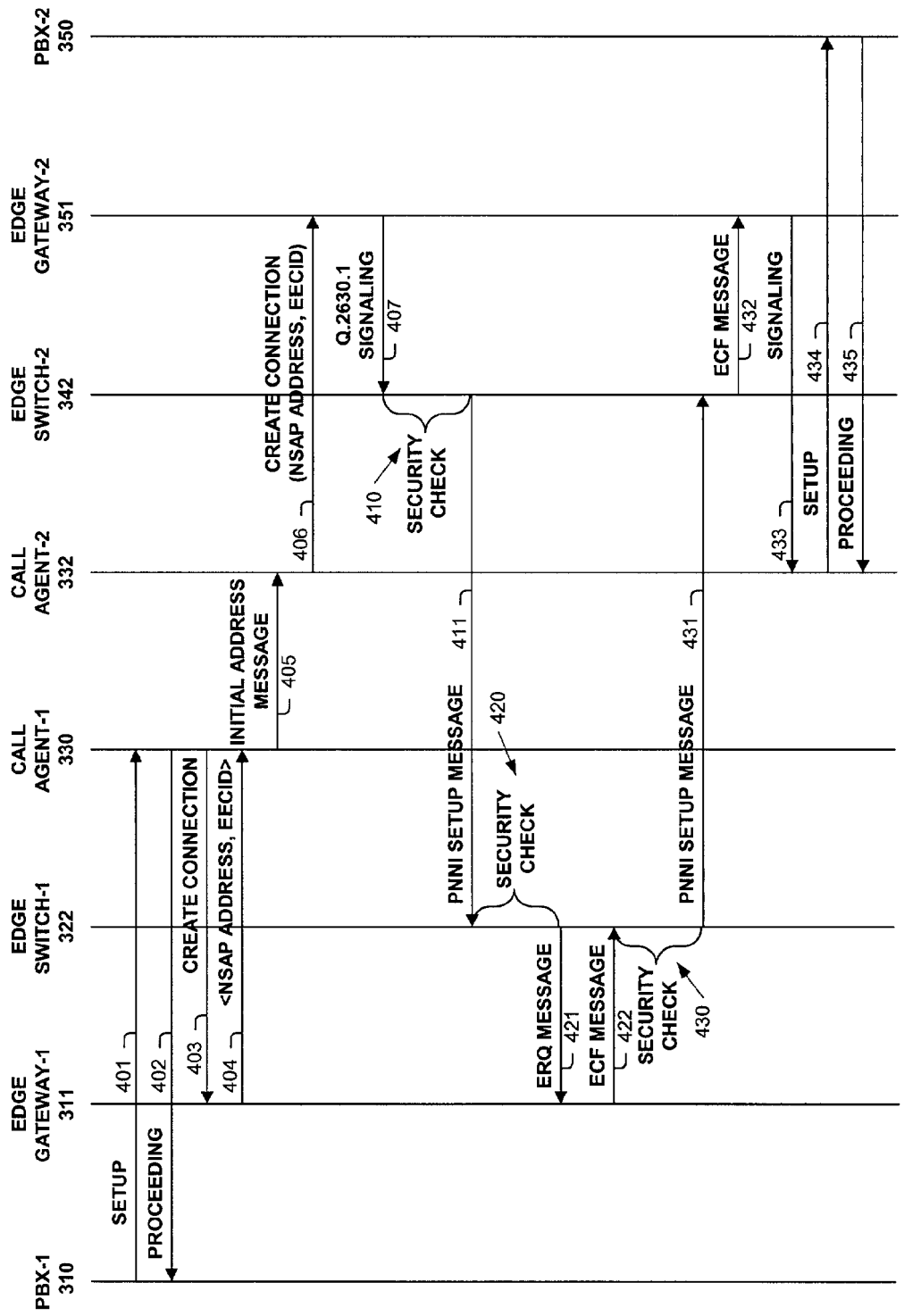
FIG. 4A is an exemplary message sequence chart for setting up a call according to one embodiment.

FIG. 4A illustrates a message sequence chart for an exemplary setup message flow for an ATM-ATM call in one embodiment, such as that of the network shown in FIG. 3A. Illustrated is only one of numerous possible message flows. Moreover, for simplicity, only PRI signaling from edge gateways is considered, this illustrated call flow does not address the architectural variant in which single-CID SVCs are used at the edge, nor does it address the architectural variant in which AAL2 sub-cell multiplexing is used in the core.

In the sequence of messages illustrated in FIG. 4A a backward SVC establishment model is assumed. This means that the called gateway triggers the SVC call. SVC call establishment includes the following two tasks. First, the assignment, on each edge AAL2 VC, of a CID to the call. Second, the establishment, within the core, of a single-CID SVC for the call.

An edge gateway is provisioned with one or more Voice End System Addresses (VESA's) that are different from its ATM End System Address (AESA). The VESAs and the AESA could be in the NSAP or E.164 format. These addresses are registered with PNNI/AINI routing. The EGW's AESA is used for normal ATM SVC calls that are routed to the EGW. The VESA is used for voice calls which are routed over a pre-existing multiplexed AAL2 VC at the edge rather than over an end-to-end SVC. The VESA refers to a voice bearer group consisting of one or more AAL2 VCs between an EGW and an AAL2 multiplexor/switch. If multi-homing is used, each voice bearer group is assigned a unique VESA.

The originating gateway provides the applicable VESA to the terminating gateway so that the latter can place an SVC call to it. Only one VESA is provided if multi-homing is supported. This is because, at this point, a decision has been made on which voice bearer group is to be used for the voice call. The VESA is provided through the SDP connection descriptor which is communicated to the far-end gateway through the call agent or network of call agents. The SDP string can be directly tunneled through the inter-call agent protocol such as Q.BICC (Q.1901), or decomposed into a set of parameters and reconstructed by the terminating call agent.

The originating gateway also communicates, to the terminating gateway, a end-to-end connection identifier (EE-CID) parameter. This has been also called the backbone network connection identifier (BNC-ID) in some standards. Its serves to bind calls at the (voice) service level to ATM connections in a backward call model. The originating gateway creates a EECID for each new (voice) service connection request from the call agent. The terminating gateway tunnels the received EECID through bearer signaling protocols such as Q.2630.1 and Q.2931.

When the originating gateway receives it, it can correlate the bearer signaling request with the voice call.

The edge gateway sends a Q.2630.1 (Q.AAL2) message to the AAL2 switch which serves as its proxy signaling agent in the core ATM network. This AAL2 multiplexor triggers an SVC request in the core through a UNI or UNI-like interface to the ATM edge switch. The AAL2 multiplexor at the originating edge switch binds the core SVC to a CID in the access. It communicates this association to the originating edge gateway through Q.2630.1 (Q.AAL2).

Full-duplex call cut-through can take place at alerting/ACM time or at connect/ANM time. This is a provisioned property of each trunk group. If full-duplex cut-through takes place at connect/ANM time, then half-duplex cut-through at alerting/ACM time is needed only for the remote ring-back feature. Referring specifically to FIG. 4A, an exemplary message sequence chart for establishing a call across the network illustrated in FIG. 3A is shown. Message sequence charts are well-known and often used to illustrate flow of signaling messages between components or systems.

PBX-1 310 initiates a call by sending a setup message 401 to call agent-1 330, which returns proceeding message 402. Call agent-1 330 also sends a create connection message 403 to edge gateway-1 311, which returns a message 404 typically including a network service access point (NSAP) address and end-to-end connection identifier (EECID). Call agent-1 330 then sends initial address message 405 to call agent-2 332, which proceeds to request a connection across the terminating access network by sending a create connection message 406, which typically includes a NSAP address and EECID, to edge gateway-2 351. Edge gateway-2 351 then sends a Q.2630.1 establish request (ERQ) message 407 to edge switch-2 342, which performs a security check. If the call is not authorized, then the call is terminated. Otherwise, the call is authorized. In either case, the result is communicated to edge gateway-2 351 via a Q.2630.1 establish confirm (ECF) message X (not shown). If the call is authorized, all establishment proceeds by edge switch-2 342 sending a PNNI setup message 411 to edge switch-1 322, which performs a security check as indicated by notation 420. If the call is not authorized, then the call is terminated. Otherwise, the call is authorized and call establishment proceeds by edge switch-1 322 sends a Q.2630.1 establish request (ERQ) message 421 to edge gateway-1 311, which returns a Q.2630.1 establish confirm (ECF) message 422.

Edge switch-1 322 performs another security check as indicated by notation 430. If the call is not authorized, then the call is terminated. Otherwise, the call is authorized and call establishment proceeds by edge switch-1 322 sending PNNI setup message 431 to edge switch-2 342, which in turn sends ECF message 432 to edge gateway-2 351. Edge gateway-2 351 sends a signaling message 433 to call agent-2 232 which then sends setup message 434 to PBX-2 350, which returns proceeding message 435. The call is then established.

Figure 4B:
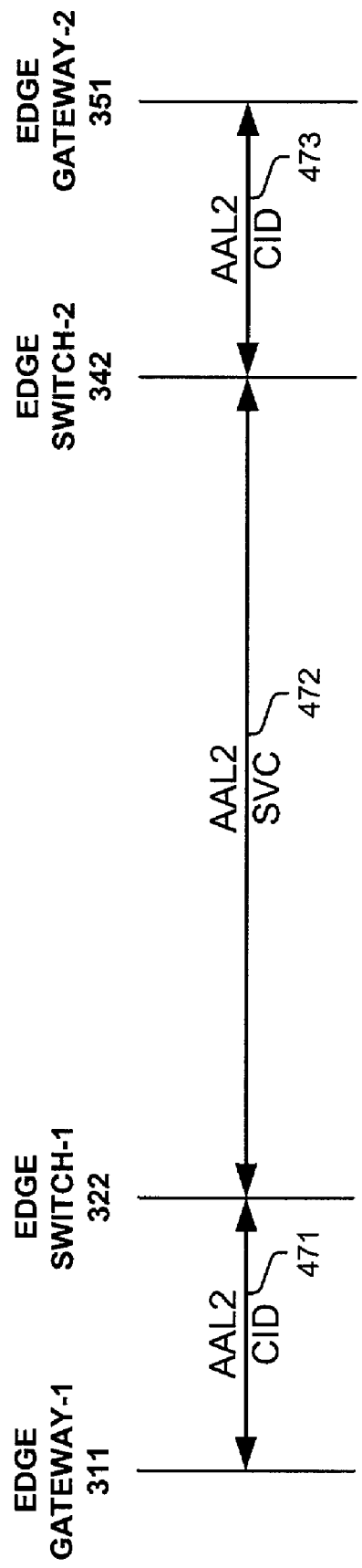
FIG. 4B is an exemplary message sequence chart during a transport phase of an exemplary call according to one embodiment.

FIG. 4B illustrates protocols using during a transport phase of an exemplary call according to one embodiment. The connection path between edge gateway-1 311 and edge switch-1 322 and between edge gateway-2 351 and edge switch-2 342 consists of AAL2 sub-channels, identified by channel identifiers (CIDs), within ATM virtual circuits. AAL2 switched virtual circuits are used between edge switch-1 322 and edge switch-2 342.

In view of the many possible embodiments to which the principles of our invention may be applied, it will be appreciated that the embodiments and aspects thereof described herein with respect to the drawings/figures are only illustrative and should not be taken as limiting the scope of the invention. For example and as would be apparent to one skilled in the art, many of the process block operations can be re-ordered to be performed before, after, or substantially concurrent with other operations. Also, many different forms of data structures could be used in various embodiments. The invention as described herein contemplates all such embodiments as may come within the scope of the following claims and equivalents thereof.

What is claimed is:

1. A method of establishing a call across a network, the method comprising:
   sending a first Q.2630.1 AAL2 message across an originating access network to a first call agent;
   the first call agent sending a create connection message to a first edge gateway;
   the first edge gateway returning a network services access point address to the first call agent;
   the first call agent forwarding the returned network services access point address to a second call agent;
   the second call agent forwarding the returned network services access point address to a second edge gateway;
   the second edge gateway sending a second Q.2630.1 AAL2 message to a second edge switch;
   response to said received second Q.2630.1 AAL2 message, the second edge switch sending a first Private Network-Network Interface (PNNI) setup message to a first edge switch; and
   the first edge switch sending a first call setup message to the first edge gateway.

2. The method of claim 1, further comprising the second edge switch performing a first call setup authorization check in response to receiving the second Q.2630.1 AAL2 message.

3. The method of claim 1, further comprising the first edge switch performing a second call setup authorization check in response to receiving the first Private Network-Network Interface (PNNI) setup message.

4. The method of claim 1, further comprising the first edge gateway sending a second call setup message to the first edge switch; and in response to receiving second call setup message, the first edge switch performing a third call set authorization check.

5. The method of claim 4, further comprising the first edge switch sending a second Private Network-Network Interface (PNNI) setup message to the second edge switch; and the second edge switch sending a third call setup message to the second edge gateway.

6. The method of claim 4, further comprising the second edge switch performing a first call setup authorization check in response to receiving the second Q.2630.1 AAL2 message.

7. The method of claim 6, further comprising the first edge switch performing a second call setup authorization check in response to receiving the first Private Network-Network Interface (PNNI) setup message.

8. A system for establishing a call across a network, the system comprising:
   means for sending a first Q.2630.1 AAL2 message across an originating access network to a first call agent;
   means for the first call agent to send a create connection message to a first edge gateway;
   means for the first edge gateway to return a network services access point address to the first call agent;
   means for the first call agent to forward the returned network services access point address to a second call agent;
   means for the second call agent to forward the returned network services access point address to a second edge gateway;
   means for the second edge gateway to send a second Q.2630.1 AAL2 message to a second edge switch;
   means for the second edge switch being responsive to said received second Q.2630.1 AAL2 message, to send a first Private Network-Network Interface (PNNI) setup message to a first edge switch; and
   means for the first edge switch to send a first call setup message to the first edge gateway.

9. The system of claim 8, comprising means for the second edge switch to perform a first call setup authorization check in response to receiving the second Q.2630.1 AAL2 message.

10. The system of claim 8, comprising means for the first edge switch to perform a second call setup authorization check in response to receiving the first Private Network-Network Interface (PNNI) setup message.

11. The system of claim 8, comprising means for the first edge gateway to send a second call setup message to the first edge switch; and means for the first edge switch to perform a third call set authorization check in response to receiving second call setup message.

* * * * *

UNITED STATES PATENT AND TRADEMARK OFFICE
CERTIFICATE OF CORRECTION

PATENT NO. : 7,065,093 B1  
APPLICATION NO. : 09/859865  
DATED : June 20, 2006  
INVENTOR(S) : Kumar et al.

Page 1 of 1

It is certified that error appears in the above-identified patent and that said Letters Patent is hereby corrected as shown below:

On the title page item (57) Abstract, line 4, replace "A.2630.1" with -- Q.2630.1 --

Col. 5, line 45, replace "sigaling" with -- signaling --

Col. 6, line 46, replace "sigaling" with -- signaling --

Col. 8, line 60, replace "all" with -- call --

Col. 9, line 8, replace "232" with -- 332 --

Col. 9, line 47, replace "response" with -- responsive --

Col. 10, line 37, replace "switch being" with -- switch, being --

Signed and Sealed this

Twenty-ninth Day of May, 2007

JON W. DUDAS  
*Director of the United States Patent and Trademark Office*